US009569059B2

(12) United States Patent
Griffin

(10) Patent No.: US 9,569,059 B2
(45) Date of Patent: Feb. 14, 2017

(54) REFERENCE-POINT-BASED STATIC-SCALE MAPPING APPLICATION

(71) Applicant: Black Berry Limited, Waterloo (CA)

(72) Inventor: Jason Tyler Griffin, Kitchener (CA)

(73) Assignee: BlackBerry Limited, Waterloo, CA (US)

( * ) Notice: Subject to any disclaimer, the term of this patent is extended or adjusted under 35 U.S.C. 154(b) by 306 days.

(21) Appl. No.: 13/666,184

(22) Filed: Nov. 1, 2012

(65) Prior Publication Data

US 2014/0118404 A1    May 1, 2014

(51) Int. Cl.
*G06F 3/0481* (2013.01)

(52) U.S. Cl.
CPC ... *G06F 3/0481* (2013.01); *G06F 2203/04803* (2013.01); *G09G 2354/00* (2013.01)

(58) Field of Classification Search
CPC . G01C 21/367; G01C 21/3682; G09B 29/106; G09G 5/00
USPC .......................................................... 345/660
See application file for complete search history.

(56) References Cited

U.S. PATENT DOCUMENTS

| 5,731,979 | A | * | 3/1998 | Yano et al. .................... 701/455 |
| 5,801,692 | A | * | 9/1998 | Muzio ................. G06F 3/04895 715/764 |
| 5,973,689 | A | * | 10/1999 | Gallery .................... G06F 3/016 345/157 |
| 6,202,026 | B1 | * | 3/2001 | Nimura et al. ................ 701/455 |
| 7,743,337 | B1 | * | 6/2010 | Maeda ............... G01C 21/3667 340/995.1 |
| 2004/0030492 | A1 | * | 2/2004 | Fox et al. ..................... 701/208 |
| 2004/0204141 | A1 | * | 10/2004 | Nakayama ............. G06F 3/016 455/566 |
| 2005/0057509 | A1 | * | 3/2005 | Mallett ................... G06F 3/016 345/163 |
| 2006/0139375 | A1 | * | 6/2006 | Rasmussen et al. .......... 345/641 |
| 2008/0072154 | A1 | * | 3/2008 | Michaelis ........... G06F 3/04812 715/727 |
| 2008/0319662 | A1 | | 12/2008 | Kagota |

(Continued)

FOREIGN PATENT DOCUMENTS

| JP | 2000348286 A | | 12/2000 |
| JP | 2010181945 A | * | 8/2010 |

(Continued)

OTHER PUBLICATIONS

Niklas Elmqvist, Yann Riche, Nathalie Henry-Riche, Jean-Daniel Fekete, Melange: Space Folding for Multi-Focus Interaction, 2008, Proceedings of the SIGCHI Conference on Human Factors in Computing Systems (CHI '08), pp. 1333-1342.*

(Continued)

*Primary Examiner* — Michael J Cobb
(74) *Attorney, Agent, or Firm* — Moffat & Co.

(57) ABSTRACT

A computer-implemented mapping method comprises determining a fixed reference point, displaying a static-scale map on a display screen of a computing device such that the map always includes the fixed reference point, and displaying a graphical discontinuity indicator on the map to represent a discontinuity in the map, the graphical discontinuity indicator dividing the map into a first map area surrounding the fixed reference point and a second map area that is geographically spaced apart from the first map area.

6 Claims, 12 Drawing Sheets

(56) References Cited

U.S. PATENT DOCUMENTS

| | | | |
|---|---|---|---|
| 2009/0097414 A1 | 4/2009 | Yoon | |
| 2011/0097001 A1* | 4/2011 | Labbi | G06K 9/6219 |
| | | | 382/225 |
| 2011/0187741 A1* | 8/2011 | Akiya et al. | 345/625 |
| 2012/0007854 A1* | 1/2012 | Cho | 345/419 |
| 2012/0311482 A1* | 12/2012 | Kwak et al. | 715/781 |
| 2013/0249812 A1* | 9/2013 | Ramos | G06F 3/0481 |
| | | | 345/173 |
| 2013/0249951 A1* | 9/2013 | Qing | 345/660 |
| 2013/0297206 A1* | 11/2013 | Heng et al. | 701/532 |
| 2014/0071170 A1* | 3/2014 | Kroeber | 345/660 |

FOREIGN PATENT DOCUMENTS

| | | | | |
|---|---|---|---|---|
| JP | 5241545 B2 * | 7/2013 | | |
| WO | WO 2012152982 A1 * | 11/2012 | | G01C 21/367 |

OTHER PUBLICATIONS

Niklas Elmqvist, Yann Riche, Nathalie Henry-Riche, Jean-Daniel Fekete, Melange: Space Folding for Visual Exploration, 2010, IEEE Transactions on Visualization and Computer Graphics, 16(3):468-483.*

Wikipedia "History Line: 1914-1918".

European Search Report dated Apr. 17, 2013 from corresponding EP Patent Application No. 12190938.6.

"RSI Winds" Riverside Scientific Inc Nov. 28, 2007 www.ezilon.com.

Road Map of United States of America and USA Road Map' www.ezilon.com.

Extended European Search Report dated Feb. 13, 2014.

* cited by examiner

REFERENCE-POINT-BASED STATIC-SCALE MAPPING APPLICATION

CROSS-REFERENCE TO RELATED APPLICATIONS

This is the first application filed for the present technology.

TECHNICAL FIELD

The present technology relates generally to computing devices and computer software and, in particular, to digital mapping techniques and mapping applications for computing devices.

BACKGROUND

With most current mapping applications, it is frequently the case that the user may lose a sense of scale (or zoom level), which is particularly exacerbated on mobile devices with small display screens. The user zooms in to view map details and then zooms out to orient oneself. Having to repeatedly zoom in and out is thus inconvenient and time-consuming for the user of the mapping application. A technical solution to this problem would thus be highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
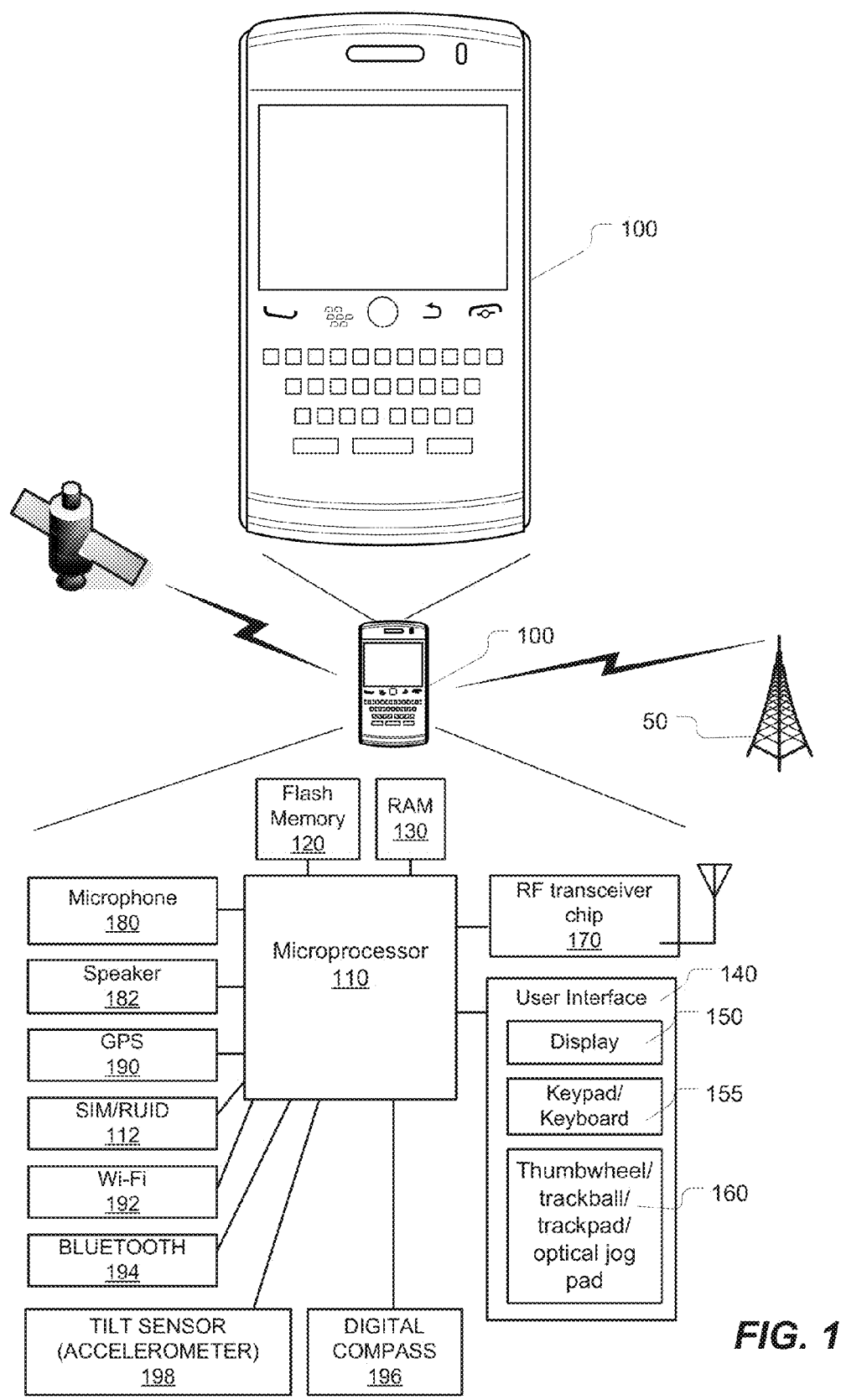
FIG. 1 is a depiction of a mobile device as one example of a computing device on which the present technology may be implemented.

The present technology provides a novel way for a computing device such as for example a mobile device to display a map on a display screen of the device. The map is fixed or anchored about a fixed reference point that is always displayed on the map. The map has a static scale (i.e. a fixed zoom). When the user pans beyond the current area of interest that includes the fixed reference point, the map displays a graphical indicator representing a discontinuity in the map. This graphical indicator divides the map into a first map area and a second map area that is spaced apart by a geographical distance. The graphical indicator may be a plurality of lines graphically representing a stack of map folds or an accordion or any other graphical depiction that visually suggests to the user that there is a geographical break or discontinuity in the map representation onscreen. Thus, a current location, a point of interest, or a destination may be viewed in the second map area at the same static scale while still seeing the fixed reference point in the first map area. The map areas may be rectangular in which case the second map area may be beside or adjacent the first map area. The map areas may be any suitable shape. This novel mapping technology enables the user to view points of interest, a current location, a destination and its immediate vicinity (or simply to pan the map to a more distant area) while still maintaining a concurrent view of the fixed reference point and its immediate vicinity. This novel map paradigm overcomes some of the problems associated with conventional mapping applications where the user is obliged to repeatedly zoom in and out in order to view details while maintaining a sense of orientation or perspective.

Accordingly, one aspect of the present technology is a computer-implemented mapping method that entails determining a fixed reference point, displaying a static-scale map on a display screen of a computing device such that the map always includes the fixed reference point, and displaying a graphical indicator on the map to represent a discontinuity in the map, the graphical indicator dividing the map into a first map area surrounding the fixed reference point and a second map area that is geographically spaced apart from the first map area.

Another aspect of the present technology is a computer-readable medium comprising instructions in code which when loaded into a memory and executed by a processor of a computing device cause the computing device to determine a fixed reference point, display a static-scale map on a display screen of a computing device such that the map always includes the fixed reference point, and display a graphical indicator on the map to represent a discontinuity in the map, the graphical indicator dividing the map into a first map area surrounding the fixed reference point and a second map area that is geographically spaced apart from the first map area.

Another aspect of the present technology is a computing device that includes a processor operatively coupled to a memory to determine a fixed reference point and a display coupled to the processor and memory for displaying a static-scale map such that the map always includes the fixed reference point and for displaying a graphical indicator on the map to represent a discontinuity in the map, the graphical indicator dividing the map into a first map area surrounding the fixed reference point and a second map area that is geographically spaced apart from the first map area.

The details and particulars of these aspects of the technology will now be described below, by way of example, with reference to the drawings.

By way of overview, the present technology provides an innovative mapping technique that employs a static-scale map that is graphically anchored about a fixed reference point. In other words, the map is fixed or anchored about a fixed reference point that is always displayed on the map, whether the fixed reference point is visually identified (or labelled) on the map as such or not. The map maintains a static scale (i.e. a fixed zoom level) in most embodiments. When the map application is to display a location or area beyond the current area of interest that includes the fixed reference point, the map then displays a graphical indicator representing a discontinuity in the map. This graphical indicator divides the map into a first map area and a second map area that is spaced apart by a geographical distance. The map view thus simultaneously and concurrently presents two map areas as part of the same map with a graphical indicator to represent the geographical discontinuity, break or gap between the two areas. This mapping technology may be implemented on a general-purpose computing device which may include a mobile device, tablet, smart phone, PDA, laptop, etc.

FIG. 1 is a depiction of a mobile device as one example of a computing device. This computing device, which is generally designated by reference numeral 100, includes a processor 110 and memory 120, 130 for executing one or more applications. The memory may include flash memory 120 and/or random access memory (RAM) 130. Other types or forms of memory may be used.

As depicted by way of example in FIG. 1, the computing device 100 includes a user interface 140 for interacting with the device and its applications. The user interface 140 may include one or more input/output devices, such as a display screen 150 (e.g. an LCD or LED screen or touch-sensitive display screen), and a keyboard or keypad 155. The user interface may also include an optical jog pad 160 and/or a thumbwheel, trackball, track pad or equivalent.

As depicted by way of example in FIG. 1, in the case where the computing device 100 is a mobile device, it includes a transceiver 170 for communicating with other devices. The transceiver 170 may be a radiofrequency (RF) transceiver for wirelessly communicating with one or more base stations 50 over a cellular wireless network using cellular communication protocols and standards for both voice calls and packet data transfer such as GSM, CDMA, GPRS, EDGE, UMTS, LTE, etc. Where the computing device 100 is a wireless communications device, the device may include a Subscriber Identity Module (SIM) card 112 for GSM-type devices or a Re-Usable Identification Module (RUIM) card for CDMA-type devices. The RF transceiver 170 may include separate voice and data channels.

Alternatively, where the computing device is a wired device like a desktop computer, laptop, etc., the transceiver 170 of the computing device 100 may be a modem or equivalent (for wired communications) using, for example, the TCP/IP protocol for Internet data communication. The computing device 100 may also include one or more ports for wired connections, e.g. USB, HDMI, FireWire (IEEE 1394), etc.

The computing device 100 includes a speech-recognition subsystem that has a microphone 180 for transforming voice input in the form of sound waves into an electrical signal. The electrical signal is then processed by a speech-recognition module (digital signal processor) to determine keywords or phrases from the voice input. Optionally, the computing device 100 may include a speaker 182 and/or an earphone jack.

Optionally, the computing device 100 may also optionally include a positioning subsystem such as a Global Positioning System (GPS) receiver 190 (e.g. in the form of a chip or chipset) for receiving GPS radio signals transmitted from one or more orbiting GPS satellites. Any other Global Navigation Satellite System (GNSS), such as GLONASS or Galileo, may be used for satellite-based positioning. Other positioning subsystems, including radiolocation techniques, signal trace techniques, WI-FI® (e.g. IEEE 802.11) positioning system (WPS), etc. may also be used to provide current location data for the device.

Optionally, the computing device 100 may include a WI-FI® transceiver 192, a Bluetooth® transceiver 194, and/or a near-field communications (NFC) chip. The computing device 100 may also optionally include a transceiver for WiMAX® (IEEE 802.16), a transceiver for ZIGBEE® (IEEE 802.15.4-2003 or other wireless personal area networks), an infrared transceiver or an ultra-wideband transceiver.

Optionally, the computing device may include other sensors like a digital compass 196 and/or a tilt sensor or accelerometer 198.

As noted above, a mobile device or wireless communications device is one example of a computing device 100 on which the present technology may be implemented. Other computing devices 100 may include desktop personal computers, laptops, palmtops, tablets, game consoles, or other such devices having instant messaging capabilities. As noted above, the technologies disclosed herein may be employed on either wireless or wired devices. For example, where the computing device is a personal computer, the user interface may include a keyboard, a mouse that may optionally be touch-sensitive or have a scroll wheel, roller, or equivalent mechanism for scrolling, a liquid crystal display (LCD) or light-emitting diode (LED) display screen that may or may not be touch-sensitive. The computer may include an embedded or standalone microphone, a headset with a microphone, a webcam with a microphone, etc. The computer may optionally include an external stylus pad operating in conjunction with a handwriting recognition software module that recognizes characters or symbols written on the pad using a stylus. Such a pad may also be used by the computer to receive a swipe gesture.

To implement this novel mapping technology, the processor 110 and memory 120, 130 of the computing device 100 depicted by way of example in FIG. 1 are configured to cause a display 150 of the device to display a map, e.g. a static-scale map, anchored by a fixed reference point that includes a graphical indicator separating a first map area from a second map area that is geographically distant from the first map area.

The processor is thus operatively coupled to the memory to first determine, identify or receive as input a fixed reference point. This fixed reference point may be user-specified by receiving user input from the user interface of the device or it may be automatically determined or identified by the device without user intervention or user input. For example, the fixed reference point may be the user's home location, workplace location, a hotel, a restaurant, a school, a university, a recreational center, a Point of Interest (POI), a starting point or destination for a route programmed in a navigation application, etc. Any location may be set as the fixed reference point.

The fixed reference point is fixed or anchored in the sense that it does not move off-screen. Even though the fixed reference point is said to be fixed or anchored, it is to be understood that the map may be made to move onscreen (by e.g. by panning). In that case, the area of interest visible on the map may move with the fixed reference point provided that the latter does not move off-screen. This naturally constrains the map so that it can only move a certain amount while keeping the fixed reference point onscreen. In that sense, initial map panning of the map showing the fixed reference point confers a limited degree of freedom (panning tolerance) before it becomes necessary to introduce a graphical indicator on the map to represent a geographical discontinuity, gap or break in the map so as to be able to show (without changing the scale) the new location or new area of interest at the same time as the area around the fixed reference point.

The processor and memory are thus configured to cause the display screen to display a graphical indicator on the map to represent a discontinuity in the map. The graphical indicator visually divides, separates or splits the map into a first map area surrounding the fixed reference point and a second map area that is geographically spaced apart from the first map area.

The second map area may thus display a current location of the device, a POI, a destination, crosshairs of a panned map, etc.

By concurrently displaying both the fixed reference point in the first map area and the second map area, the user is able to see all relevant map information while maintaining a sense of orientation and perspective due to the concurrent display of the fixed reference point. Since both map areas are, in most embodiments, displayed at the same scale, the map conveys an intuitive sense of distance on the map. The scale may be such that map details like street names, civic addresses, POI labels, etc. are visible and readable. This technology overcomes the problem of having to zoom in and out to view map details while retaining a sense of orientation. These maps may also prove to be computationally more efficient to deliver to and render on a wireless device since the label positions may be, in one embodiment, predetermined for the fixed zoom level.

Figure 2:
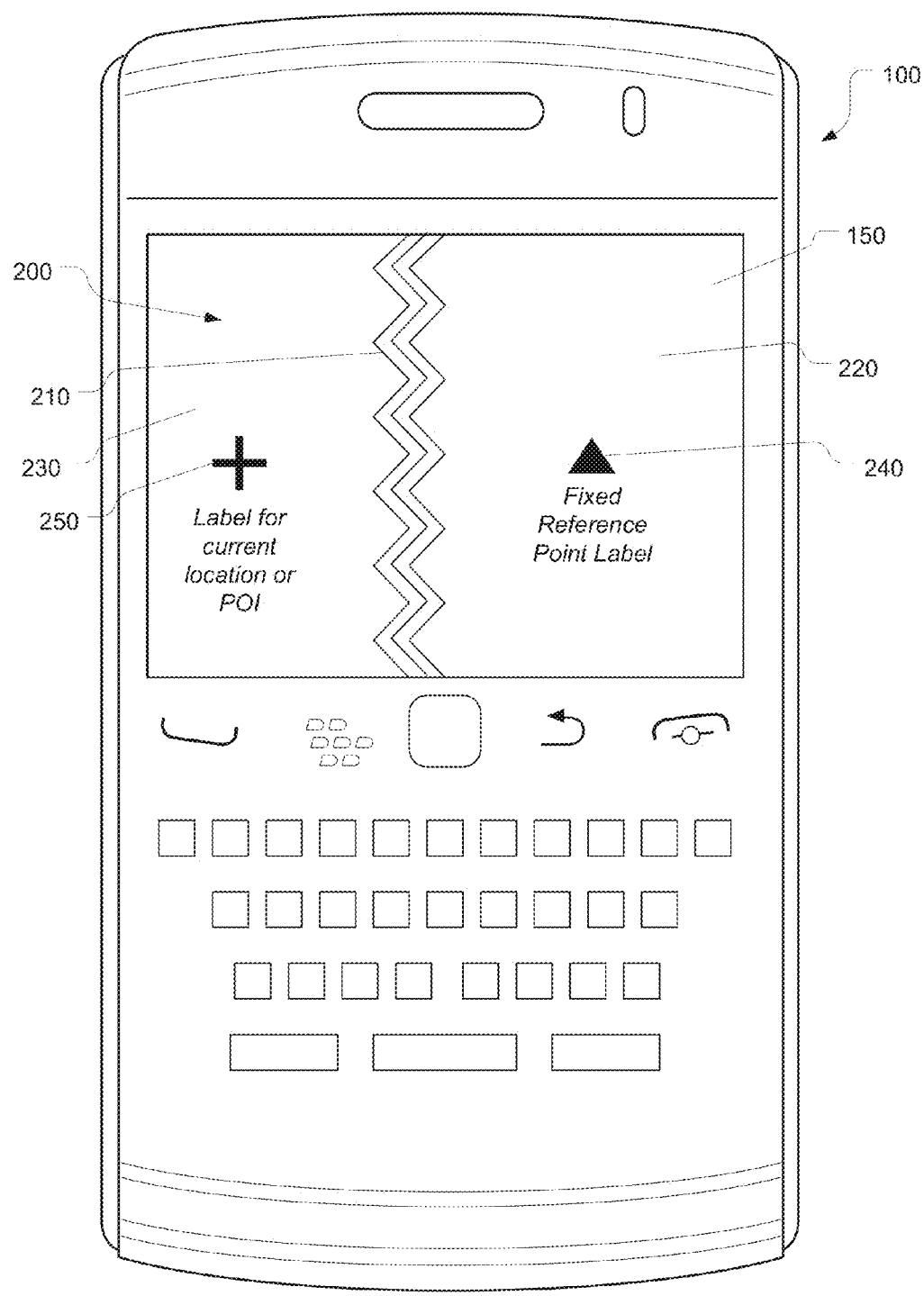
FIG. 2 is a depiction of a mobile device displaying a map having an accordion-style graphical discontinuity indicator for dividing the map into first and second map areas in accordance with one embodiment of the present technology.

FIG. 2 depicts a mobile device 100 displaying on a display screen 150 a map 200 (rendered by a map application executing on the device). The map 200 includes an accordion-style graphical indicator 210 for representing a map discontinuity or break. This graphical indicator 210 divides, separates or splits the map into a first map area 220 surrounding a fixed reference point 240 and a second map area 230 surrounding a distant location 250 (e.g. a POI, current location or any other location that is sufficiently distant from the fixed reference point that it cannot be shown on the map at the fixed scale without introducing a discontinuity in the map).

Figure 3:
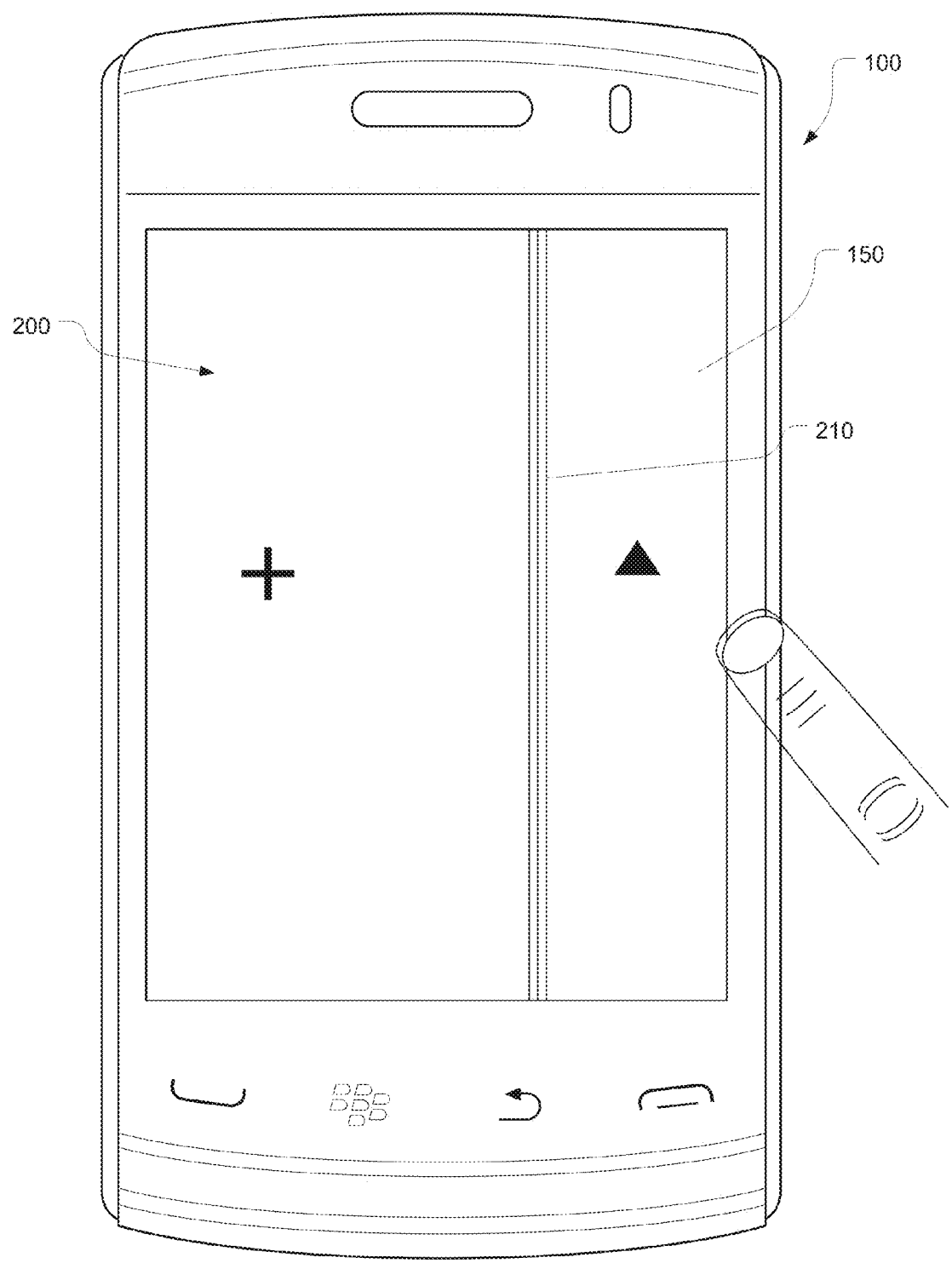
FIG. 3 is a depiction of a mobile device displaying a map having a graphical discontinuity indicator in the form of a set of parallel lines for dividing the map into first and second map areas in accordance with another embodiment of the present technology.

FIG. 3 depicts another embodiment in which the graphical indicator 210 on the map 200 comprises a plurality of parallel lines. These lines may graphically or visually represent a notional stack of map folds. This is the real-world equivalent of physically folding a paper map such that two spaced apart regions of the paper map are brought close to one another. The graphical indicator represents a geographical discontinuity, break or gap to visually inform the user that the map the two areas onscreen are not contiguous or adjacent in reality.

The lines of the graphical indicator 210 may be straight lines, curved lines, arcs, circles, squares, rectangles, polygons, etc. These lines may be solid lines, dashed lines, stippled lines, dotted lines, semi-transparent lines, coloured lines, lines of variable thickness, etc. The lines may be a combination of the shapes or features mentioned above. The graphical indicator need not be in the form of lines since any graphical object or elements that suggests a break in the map may be employed.

In one embodiment, a number of lines is proportional to a geographical distance between the first map area and the second map area. For example, in the illustrated embodiment of FIG. 3, there are three lines. The graphical indicator may be configured such that each line represents 100 meters, 200 meters, 1 km, 5 km, etc.

In one embodiment, the processor causes the display to add a line to the plurality of parallel lines as a geographical distance increases and to remove a line to the plurality of parallel lines as the geographical distance decreases. The geographical distance may increase or decrease when tracking the current location of the device or when panning the map or when searching for a location that is not visible in the current map view. Unlike conventional map applications that automatically increase or decrease the zoom to accommodate the new location or new area of interest, a map application in accordance with embodiments of this novel technology does not automatically adjust the zoom but rather retains the same scale or zoom level and accommodate the new location or new area of interest by introducing a geographical discontinuity into the map to thereby display the areas of interest separated by a graphical discontinuity indicator (or map discontinuity graphical indicator or "graphical indicator" for short).

The graphical indicator may take others forms. Again, the number of lines may represent the geographical gap between the first and second map areas. The type of graphical indicator used may be user-configurable. The proportion of onscreen map space occupied by the first map area relative to the second map space may also be user configurable. For example, the user may wish to have 80 percent of the onscreen map devoted to the second map area with only the remaining 20 percent for the first map area.

Figure 4:
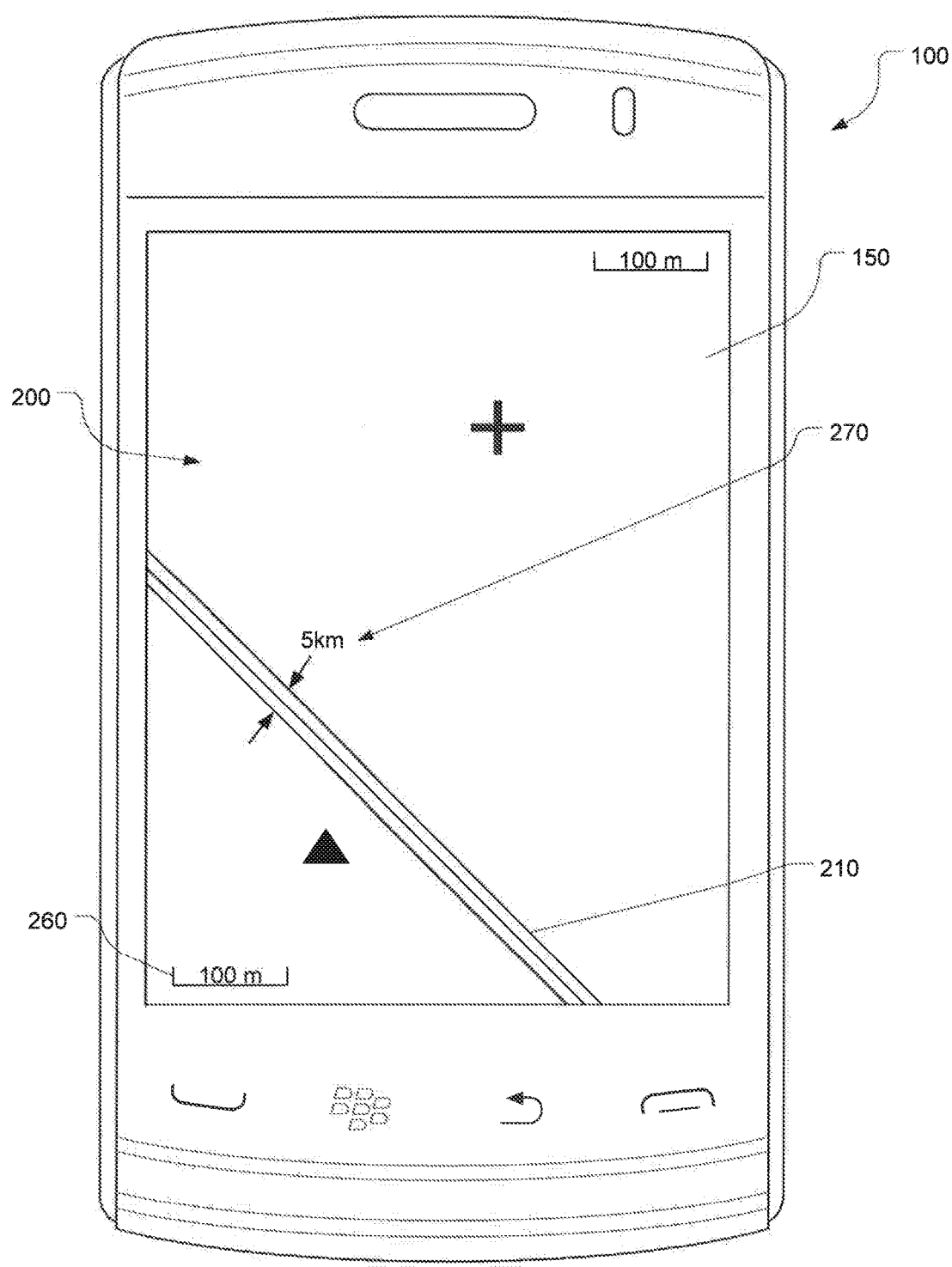
FIG. 4 is a depiction of a mobile device displaying a map having a graphical discontinuity indicator in the form of angled lines for dividing the map into first and second map areas in accordance with another embodiment of the present technology.

FIG. 4 illustrates a graphical indicator 210 in the form of a series of parallel lines. In one embodiment, as shown in FIG. 4, a legend or scale 260 may be displayed on the map. For example, the legend or scale may indicate that each line represents 100 meters, 1 km, 10 km, etc. In FIG. 4, a legend or distance scale shows, for example, a length of 100 meters for the depicted linear unit in the first map area. Also, the map displays the discontinuity distance 270. The set of parallel lines forming the graphical discontinuity indicator may represent, for example, a 5 km gap or break (discontinuity distance) in the map. Optionally, the distance scale 260 of 100 m may be displayed in the second map area to remind the user that the scale in the second map area is the same as the scale in the first map area.

Figure 5:
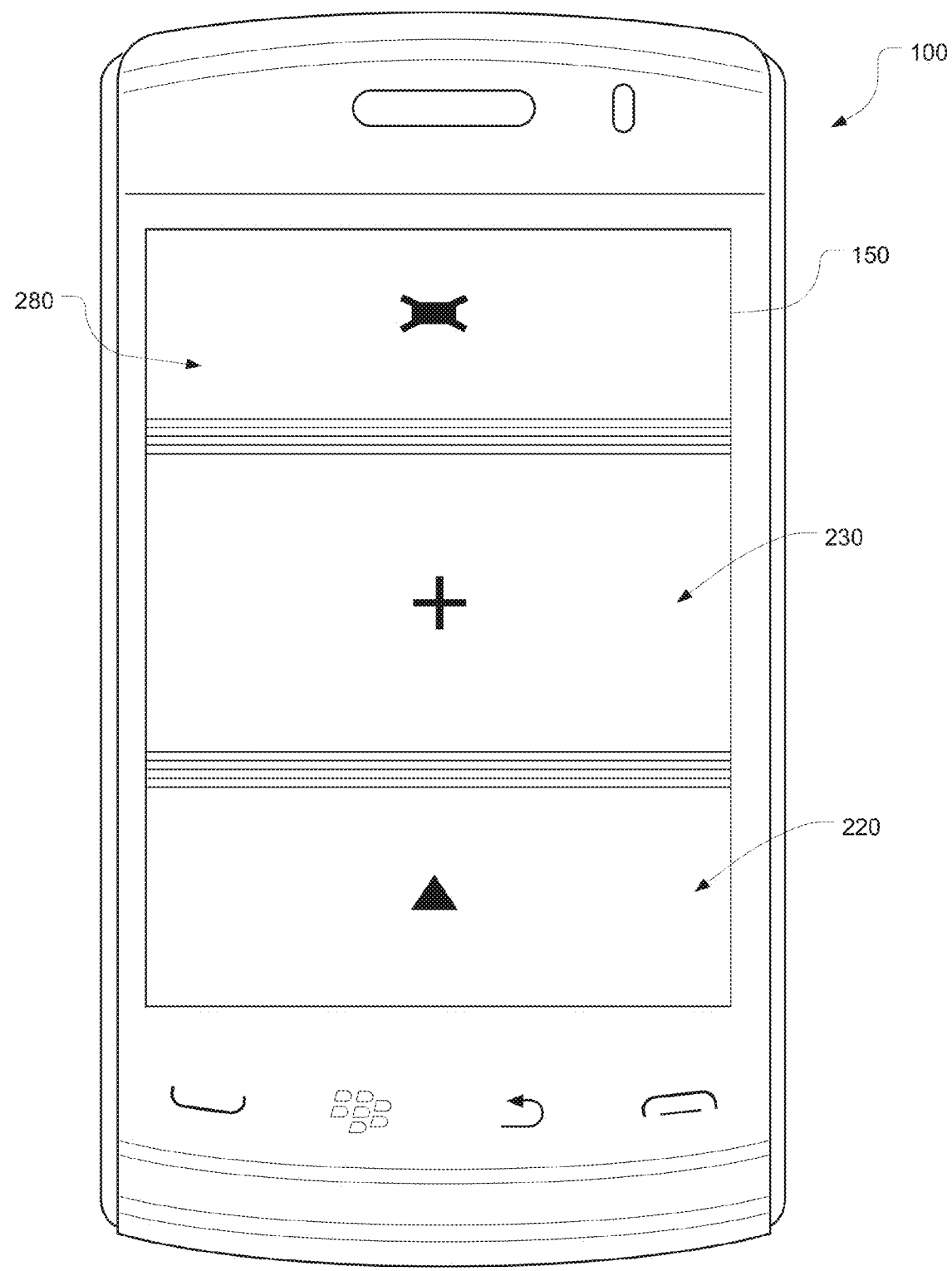
FIG. 5 is a depiction of a mobile device displaying a map having two graphical discontinuity indicators for dividing the map into first, second and third map areas in accordance with another embodiment of the present technology.

FIG. 5 depicts a further embodiment in which there are two graphical indicators dividing the map into three map areas. In response to the presence of a request for a third map area, the processor causes the display to display a further (second) graphical indicator 210 representing a further (second) discontinuity in the map. The further graphical indicator divides the second map area 230 from the third map area 280 that is also geographically spaced apart from the second map area. One example of this is shown in FIG. 5 where the first, second and third map areas 220, 230 and 280 are depicted.

This map technology may be used to display a plurality of locations that would otherwise not fit on the same map display at a detailed zoom level. For example, the map technology may be used to display a plurality of Points of Interest (POI's), a plurality of metro, subway, train or bus stations, a plurality of restaurants, cafes, hotels, stores, etc. For example, the map may simultaneously present each POI in respective map areas separated by discontinuity indicators that graphically indicate that these areas are in actuality geographically spaced apart or non-contiguous in the sense that the areas do not adjoin, connect or abut in the real world. As such, multiple map areas for different locations or POI's are presented concurrently in the same map view. This provides map detail for the immediate vicinity of each POI while permitting the user to see all, or at least a large number, of the POI's on a single map view.

Figure 6:
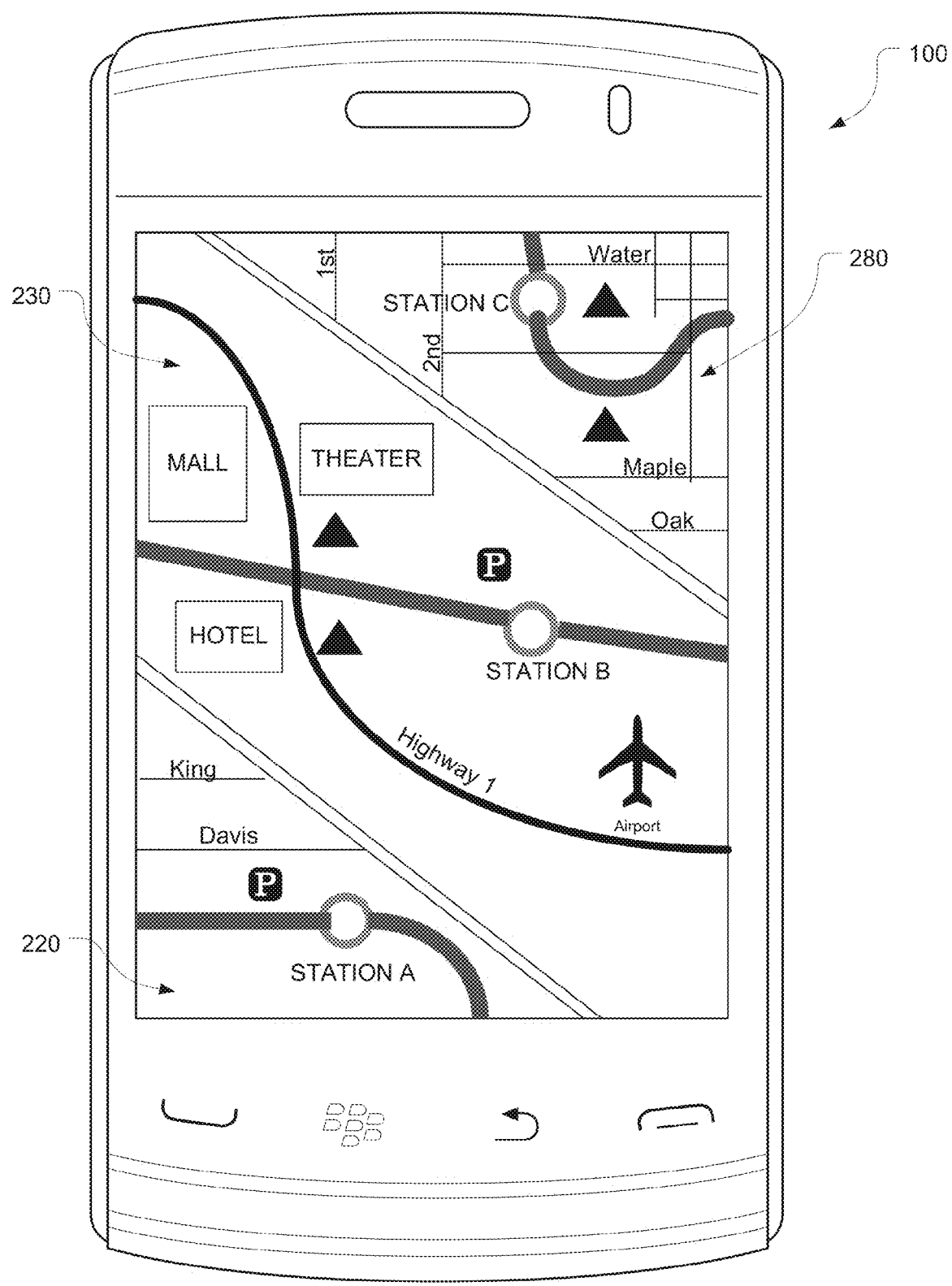
FIG. 6 is a depiction of a mobile device displaying a map having angled graphical discontinuity indicators for dividing the map into first, second and third map areas in accordance with another embodiment of the present technology.

FIG. 6 depicts an example of a map showing multiple metro or subway stations. Each station is shown at a fixed zoom level with all of the surrounding map details so that the user can see what is in the vicinity of each station. The three map areas 220, 230, 280 containing each of the three stations are separated by graphical indicators representing the geographical discontinuity between each respective pair of areas. These station-specific maps may provide in addition to local detail live scheduling for subway trains, buses, etc., in addition to weather, local alerts, real-time traffic data, local news, etc.

Figure 7:
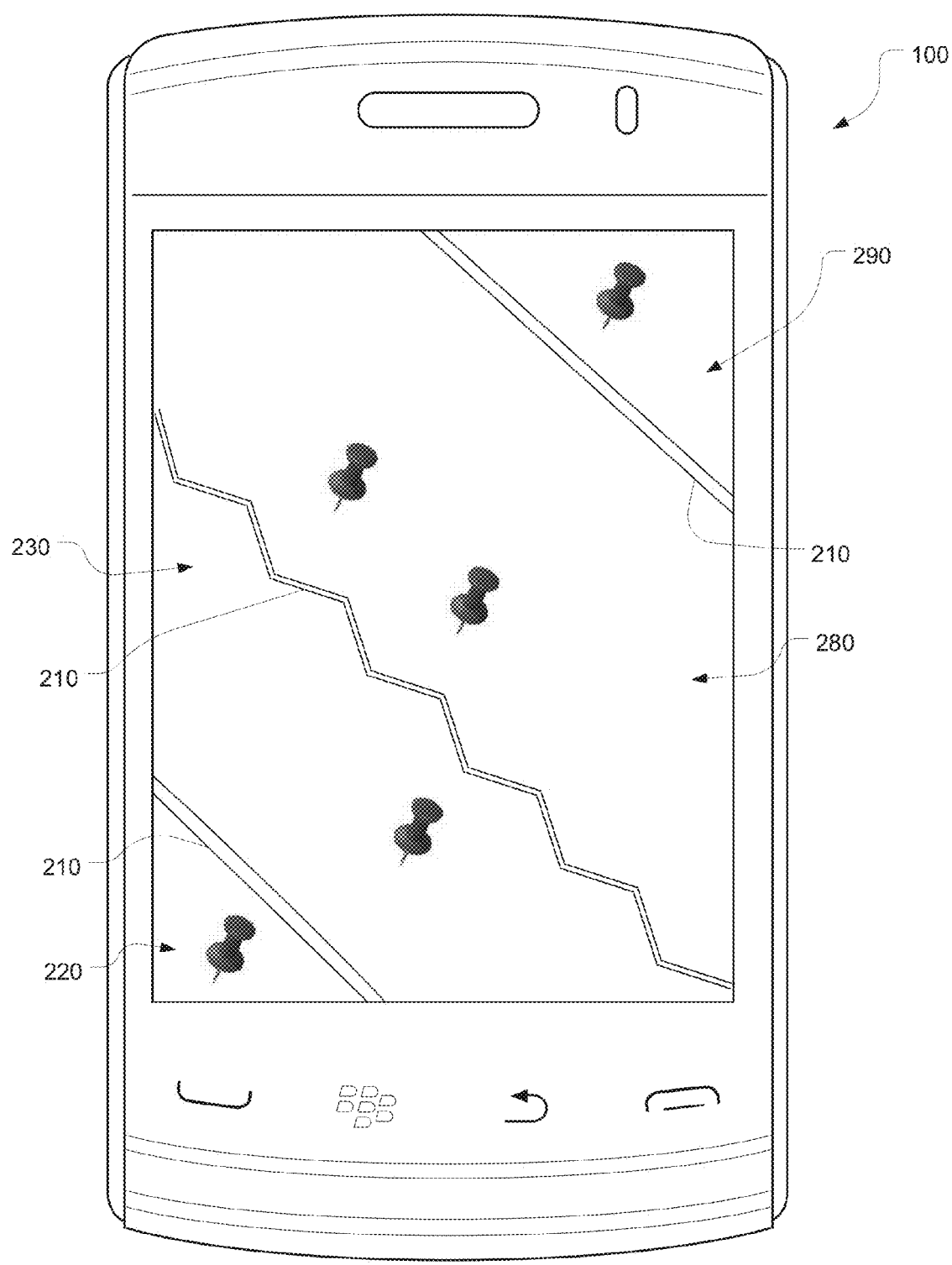
FIG. 7 is a depiction of a mobile device displaying a map having multiple graphical discontinuity indicators for dividing the map into multiple map areas in accordance with another embodiment of the present technology.

FIG. 7 illustrates another example of a map depicting a plurality of POI's. These POI's may be, for example, a group of cafes (e.g. all of the Starbucks in a city or neighbourhood or within a certain radius), a group of hotels (e.g. all of the Hilton hotels in a city or all of the four-star hotels having a pool), all toy stores, shoe stores, electronics stores, medical clinics, etc. Locations of search results may be displayed in this manner using this novel map technology to show respective map areas separated by graphical indicators. These maps may be useful for corporate sponsored maps, which may also be used in conjunction with location-based advertising.

FIG. 7 shows a map using different graphical indicators (two sets of parallel angled i.e. slanted, diagonal or oblique lines, and one set of accordion-style lines 210). The map is thus divided into four map areas 220, 230, 280, 290 by these three graphical indicators. This example illustrates that the graphical indicators of a given map need not be all of the same type.

FIG. 7 also illustrates that, if two POI's are clustered together, the map need not artificially create a discontinuity and separate these by a graphical indicator since these proximate POI's can be normally viewed together at the same fixed scale.

In one implementation, the computing device 100 displays points of interests on the map in response to a search query and then automatically divides the map into a plurality of map areas, each separated by a respective graphical discontinuity indicator, to display the multiple points of interest. Each of or a subset of the points of interest becomes one of the fixed reference points for the map. Map areas surrounding each of the displayed points of interest enables the user to view map details for the immediate vicinity of each point of interest while maintaining an overall perspective of the relative location of each of the points of interest.

From the foregoing, it is apparent that the total onscreen space occupied by the map is divided into a plurality of map areas separated by the graphical indicators. The resultant divided map is thus effectively a mosaic of map areas separated by graphical indicators representing geographical discontinuities or gaps between the various areas. Except for the graphical discontinuity indicators, the areas are visually presented adjacent to one another (separated only by the graphical discontinuity indicators) even though they are not in reality geographically adjacent or contiguous. The graphical indicators thus indicate graphically or visually to the user that the adjacent maps areas are actually geographically distant or spaced apart from one another. In one optional implementation, the crosshairs, cursor or pointer may be decelerated graphically as it crosses the boundary of the graphical indicator from one map area to the other. In another implementation, the device may emit a clicking sound as the crosshairs, cursor or pointer cross the boundary of two adjacent map areas formed by their common graphical indicator.

In most implementations, the multiple map areas have the same fixed scale. In a variant, the map areas may have two different fixed scales. Thus, a first fixed scale for a first map area may be different from a second fixed scale for a second map area. In this variant, there may be, for example, one fixed scale for a walking map and a second fixed scale for a driving map. These map scales would be fixed so that the driving map remains at its scale and the walking map remains at its scale. The device may present a user interface element to enable the user to toggle or switch between the first map area and the second map area.

Figure 8:
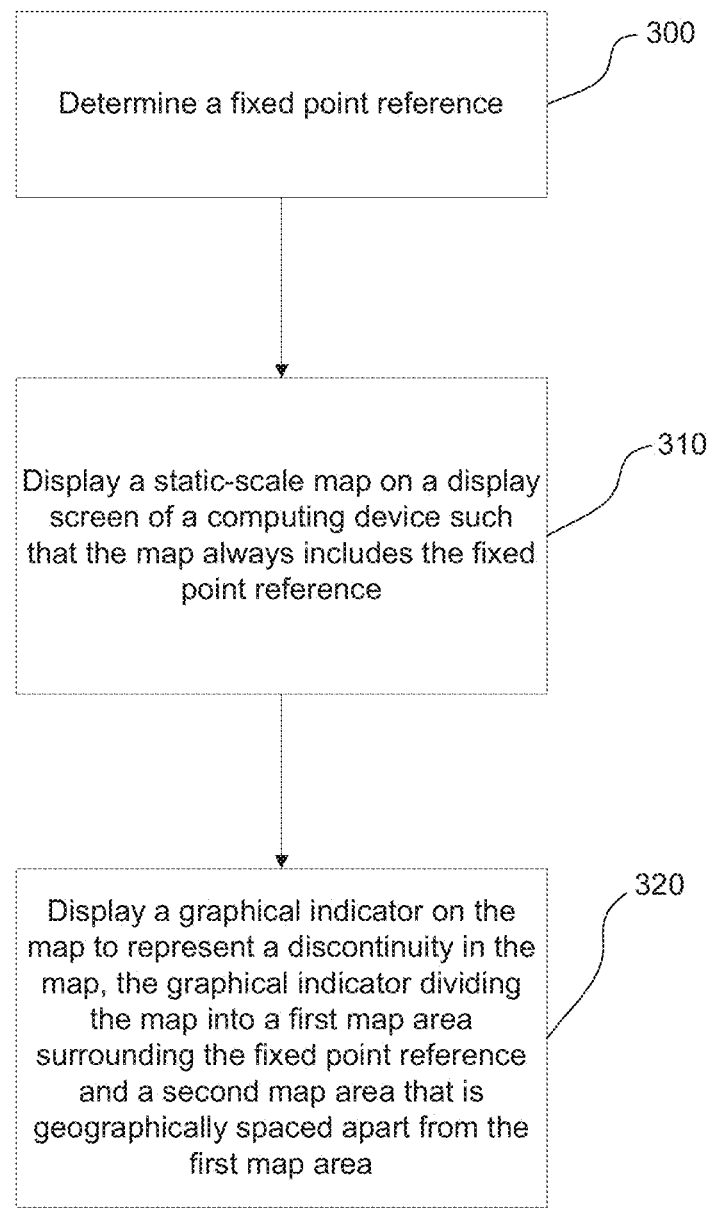
FIG. 8 is a flowchart presenting steps of a method in accordance with the present technology.

The foregoing technology thus enables a novel computer-implemented mapping method. This method is depicted in a flowchart shown in FIG. 8. As depicted in FIG. 8, the method entails a step 300 of determining a fixed reference point, a step 310 of displaying a static-scale map on a display screen of a computing device such that the map always includes the fixed reference point, and a step 320 of displaying a graphical indicator on the map to represent a discontinuity in the map, the graphical indicator dividing the map into a first map area surrounding the fixed reference point and a second map area that is geographically spaced apart from the first map area. In one implementation, the graphical indicator comprises a plurality of parallel lines representing a stack of map folds. In one implementation, the number of lines is proportional to a geographical distance between the first map area and the second map area. In one implementation, a line is added to the plurality of lines as the geographical distance increases and a line is removed from the plurality of parallel lines as the geographical distance decreases. In one implementation, a further (second) graphical indicator representing a further discontinuity in the map is displayed to divide or split the map into first, second and third map areas.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

Various examples of graphical discontinuity indicators have been disclosed in this application. It will be appreciated that these are solely examples and that many other forms or types of graphical discontinuity indicators may be used. Some additional examples of other types of forms of graphical discontinuity indicators are presented by way of example in FIGS. 9-12.

Figure 9:
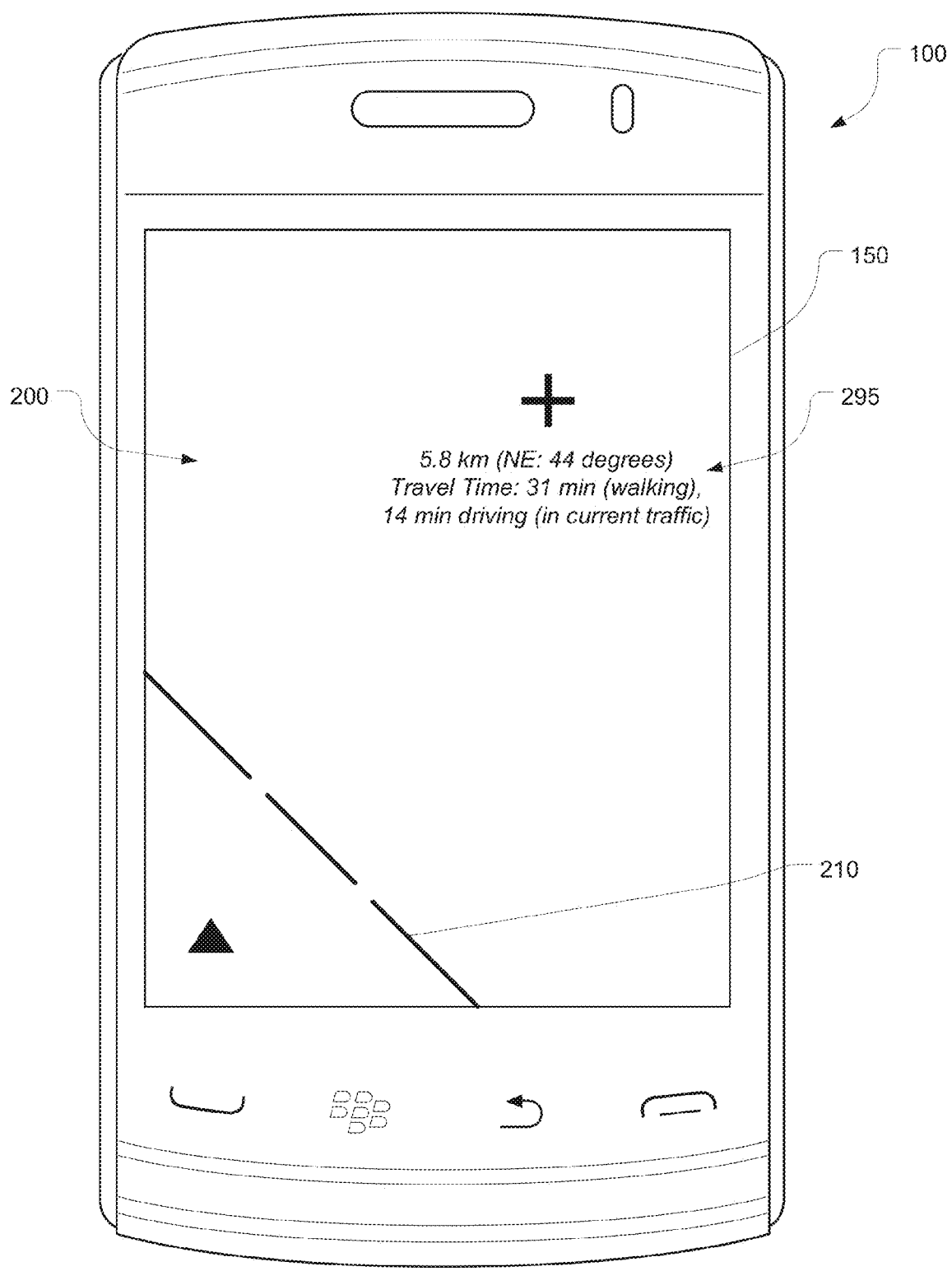
FIG. 9 depicts another example of a graphical discontinuity indicator.

In FIG. 9, the graphical discontinuity indicator 210 is a dashed or broken line wherein each dash or line segment represents a unit of distance, e.g. 100 meters, 1 km, 10 km, etc, which may be preset or user-configurable. Optionally, the map may include a legend indicating the distance represented by each dash or line segment, which may optionally be toggled on or off in response to user input. Any other symbols may be used to represent the distance, such as dots, asterisks or combinations of dashes and symbols. As further depicted in FIG. 9, the map may display location-related information 295 about the point of interest, current location or location of the crosshairs. As shown, the information 295 may include a distance from the fixed reference point to the point of interest, current location or crosshairs that is shown in the second map area. A bearing or direction (e.g. "NE" for northeast and/or a compass bearing, e.g. "44 degrees") may optionally be displayed as well. A user interface element may also optionally provide route directions. A travel time for either walking and/or driving may also be displayed. Any of this distance, heading, or travel information may be displayed automatically on the map or only in response to user input on a user interface element such as, for example, a "show details" button. Alternatively, this information 295 may be displayed in response to user input (e.g. touch input or click input) received on the icon representing the POI, current location or crosshairs. Alternatively, this information may be displayed in response to hovering the cursor or pointer over the POI, current location or crosshairs.

Figure 10:
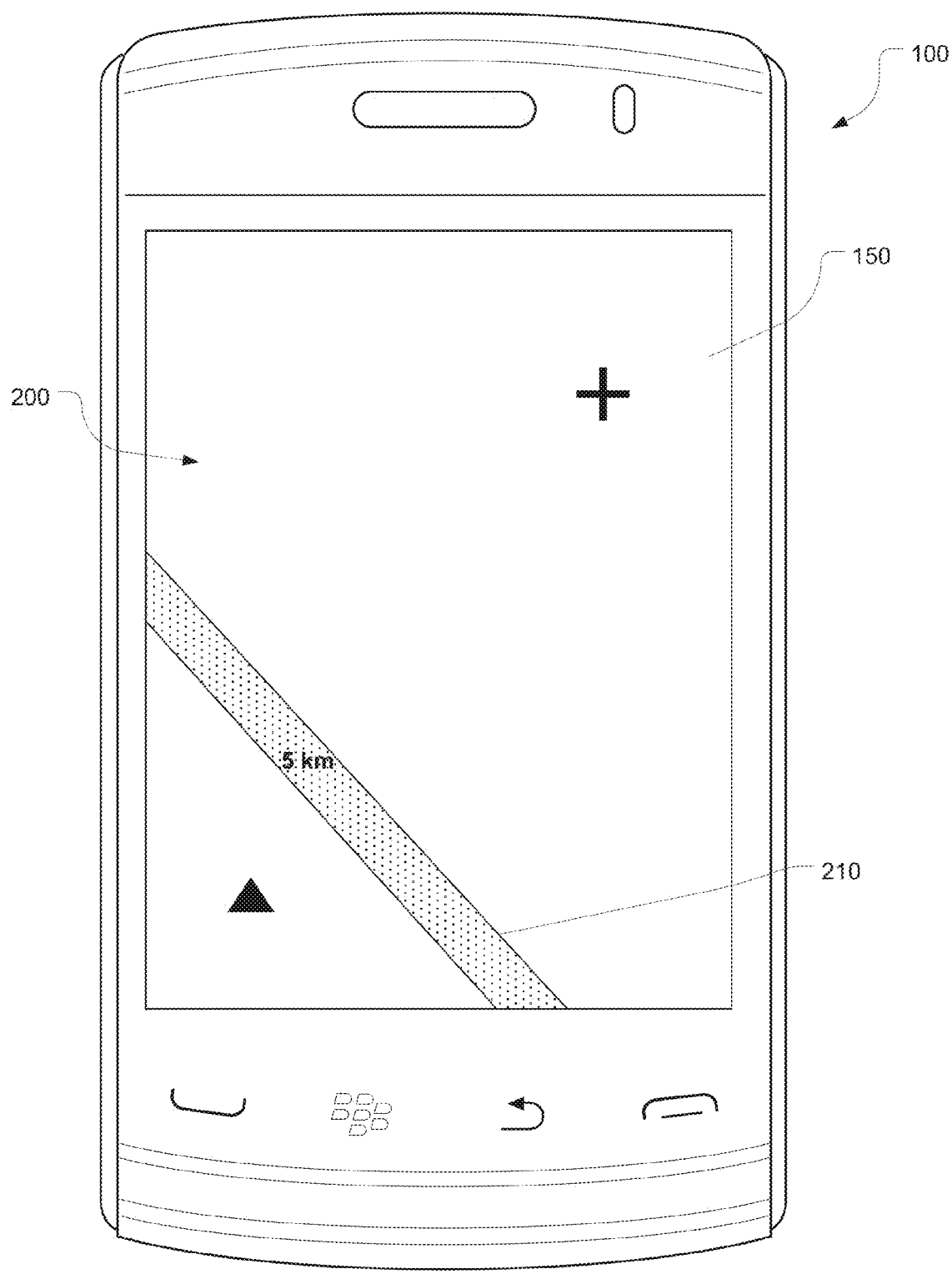
FIG. 10 depicts yet another example of a graphical discontinuity indicator.

FIG. 10 depicts another example of a graphical discontinuity indicator 210. In this example, the graphical discontinuity indicator 210 is a band (or strip) with a distance indication (e.g. "5 km") displayed within the band as shown. Any suitable graphics (e.g. dotted fill, hatched lines, cross-hatching, shading, colors, symbols, or any combination thereof) may be displayed within the band itself to distinguish it from the adjacent map areas. In one embodiment, the thickness of the band may be proportional to the geographical distance. Thus, the graphical discontinuity indicator may be dynamically varied as a geographical distance increases or decreases.

Figure 11:
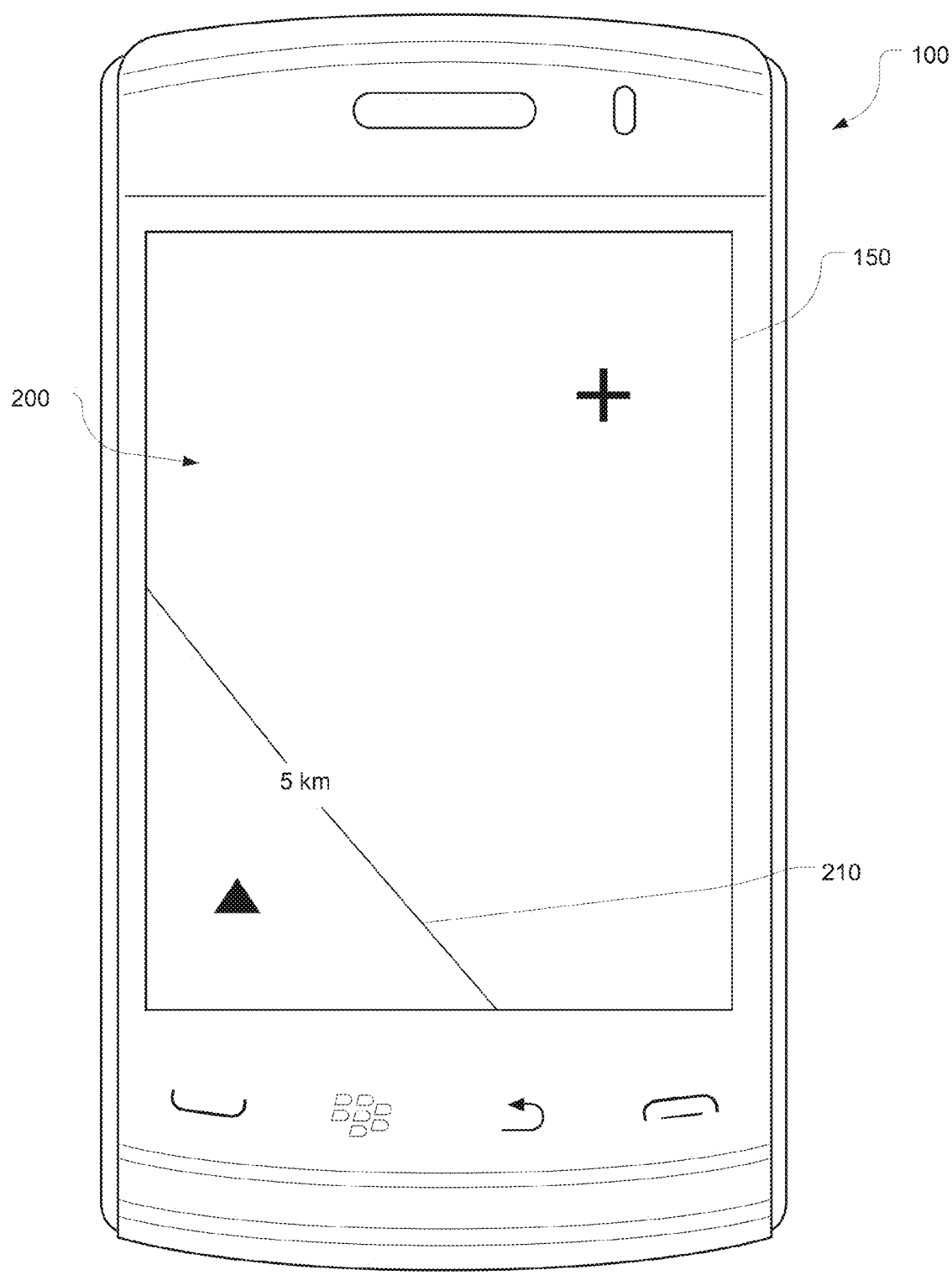
FIG. 11 depicts a further example of a graphical discontinuity indicator.

FIG. 11 depicts another example of a graphical discontinuity indicator 210. In this embodiment, the graphical discontinuity indicator 210 is a single line. In this embodiment, the discontinuity distance (e.g. "5 km") is indicated along or within the line as illustrated. The discontinuity distance is dynamically updated as the second map area is panned or as the current location changes. For example, if the map is panned further afield, the discontinuity distance may be dynamically updated from 5 km to 5.5 km to 6 km, etc. Again, the graphical discontinuity indicator is dynamically varied in this example as the geographical distance changes (i.e. is increased or decreased).

Figure 12:
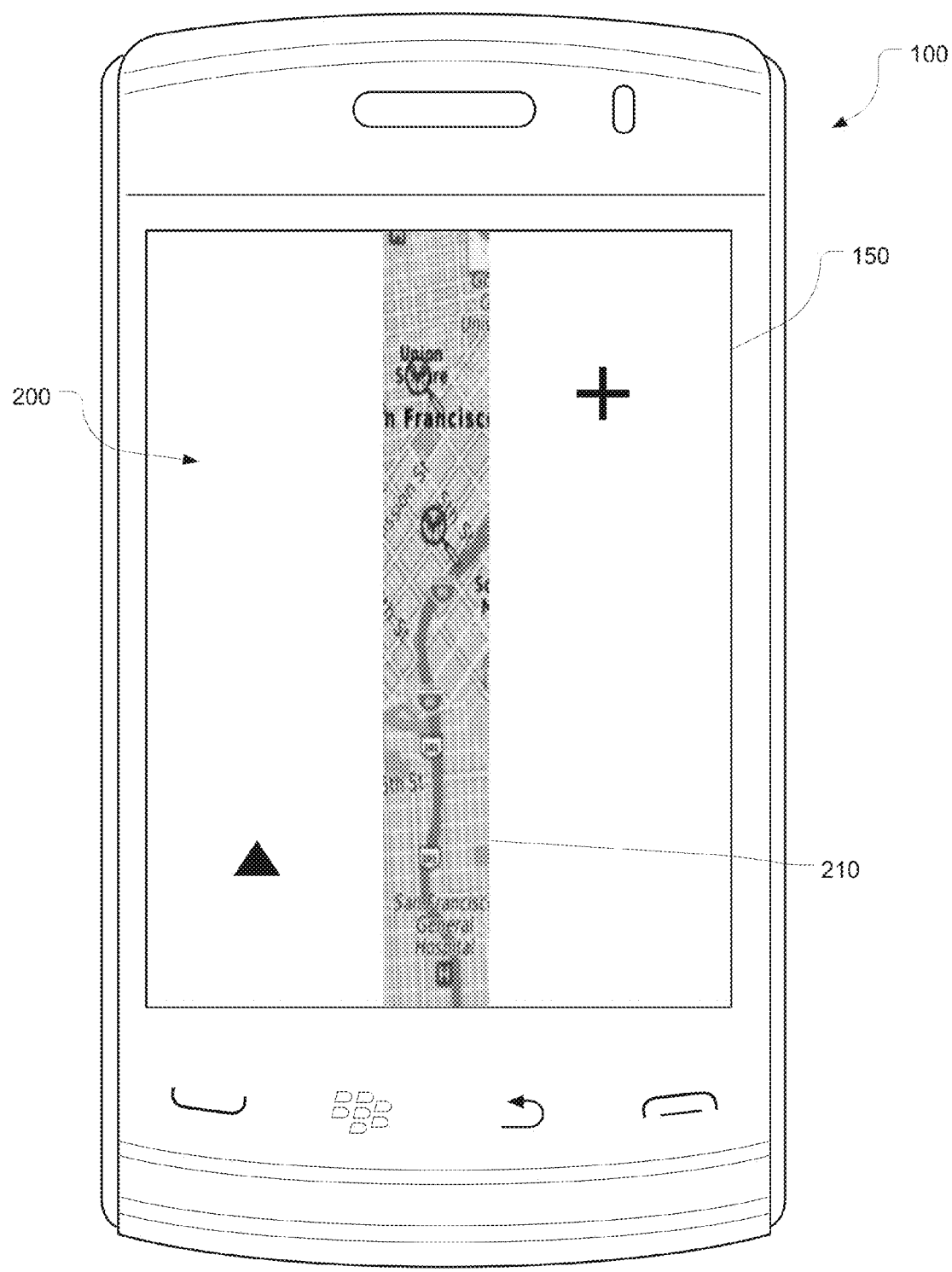
FIG. 12 depicts yet a further example of a graphical discontinuity indicator.

FIG. 12 depicts a further example of a graphical discontinuity indicator 210 which again serves to graphically divide one map area from another non-contiguous map area. In this embodiment, the graphical discontinuity indicator 210 is an intentionally warped or distorted section of map image taken at a different (e.g. much lower) zoom level than the zoom level of the first and second map areas so as to be immediately apparent that this is a graphical indicator and not a continuous part of the map areas being displayed. The graphical discontinuity indicator 210 represents the map discontinuity using a high-level, warped or distorted strip or section of the map of the geographical area between the first and second map areas. The warped map section shown in FIG. 12 is, for example, a much lesser magnification as compared to the first and second map areas so as to convey a immediate sense of distance to the user. The warped map section may be generated by graphically compressing the map in a direction aligned with a vector extending from the fixed reference point to the POI or current location. Depending on the discontinuity distance, the warped map section may need to be cropped such that the edges of the warped map section do not correspond to the common edges of the first and second map areas. However, in other embodiments, the edge of the first map area corresponds to the first edge of the warped map and the second edge of the warped map corresponds to the second map area so there is a continuous, albeit distorted, composite map image consisting of the first map area, the warped middle map section and the second map area. Optionally, the middle map section may be dynamically warped/distorted as the second map area is updated in response to panning of the map or displacement of the tracked current location. The width of the middle map section may also dynamically change as a function of the discontinuity distance. The width of the middle map section and degree of warping (visual distortion) may be preset and/or user-configurable. Instead of a warped or distorted map representation, the graphical indicator may involve any other suitable representations of folds, bends, ripples, wrinkles, or any other graphical element that suggests a map discontinuity.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:
1. A computer-implemented mapping method comprising:
performing a search using a search query for points of interest;
determining locations of search results obtained in response to the search;
determining a plurality of fixed reference points corresponding to the locations of the search results;
determining a current zoom level;

creating a map area for each reference point of the fixed reference points;

combining map areas for reference points that can be displayed simultaneously at the current zoom level;

displaying each map area at the current zoom level on a display screen of a computing device;

displaying graphical discontinuity indicators between each of the map areas;

displaying a discontinuity distance in association with at least one of the graphical discontinuity indicators to indicate a distance between two map areas divided by the respective one of the graphical discontinuity indicators; and notifying a user when a cursor is moved across one of the graphical discontinuity indicators, said notifying comprising one of emitting a sound and decelerating a movement of the cursor;

wherein each graphical discontinuity indicator represents a stack of map folds, the stack of map folds comprising a first edge of a map area, a second edge of an adjoining map area, and one or more lines between the first edge and the second edge; and wherein a total number of the one or more lines is proportional to a geographical distance between adjoining map areas and each line of the one or more lines corresponds to the same geographical distance.

2. The method as claimed in claim 1 comprising dynamically varying each graphical discontinuity indicator as the geographical distance increases or decreases between adjoining map areas separated by the graphical discontinuity indicator.

3. A non-transitory computer-readable medium comprising instructions in code which when loaded into a memory and executed by a processor of a computing device cause the computing device to:

perform a search using a search query for points of interest;

determine locations of search results obtained in response to the search;

determine a plurality of-fixed reference points corresponding to the locations of the search results;

determine a current zoom level;

create a map area for each reference point of the fixed reference points;

combine map areas for reference points that can be displayed simultaneously at the current zoom level;

display each map area at the current zoom level on a display screen of a computing device;

display graphical discontinuity indicators between each of the map areas;

display a discontinuity distance in association with at least one of the graphical discontinuity indicators to indicate a distance between two map areas divided by the respective one of the graphical discontinuity indicator; and notify a user when a cursor is moved across one of the graphical discontinuity indicators, said notifying comprising one of emitting a sound and decelerating a movement of the cursor;

wherein each graphical discontinuity indicator represents a stack of map folds, the stack of map folds comprising a first edge of a map area, a second edge of an adjoining map area, and one or more lines between the first edge and the second edge; and wherein a total number of the one or more lines is proportional to a geographical distance between adjoining map areas and each line of the one or more lines corresponds to the same geographical distance.

4. The computer-readable medium as claimed in claim 3 comprising dynamically varying each graphical discontinuity indicator as the geographical distance increases or decreases between adjoining map areas separated by the graphical discontinuity indicator.

5. A computing device comprising:

a processor operatively coupled to a memory to determine a plurality of fixed reference points by performing a search using a search query for points of interest, determining locations of search results obtained in response to the search, determining a current zoom level, creating a map area for each reference point of the fixed reference points, and combining map areas for reference points that can be displayed simultaneously at the current zoom level; and a display coupled to the processor and memory for displaying:

each map area at the current zoom level; and for displaying a plurality of graphical discontinuity indicators between each of the map areas;

a discontinuity distance in association with at least one of the graphical discontinuity indicators to indicate a distance between two map areas divided by the respective one of the graphical discontinuity indicator; and wherein the processor further notifies a user when a cursor is moved across one of the graphical discontinuity indicators, said notifying comprising one of emitting a sound and decelerating a movement of the cursor;

wherein each graphical discontinuity indicator represents a stack of map folds, the stack of map folds comprising a first edge of a map area, a second edge of an adjoining map area, and one or more lines between the first edge and the second edge; and wherein a total number of the one or more lines is proportional to a geographical distance between adjoining map areas and each line of the one or more lines corresponds to the same geographical distance.

6. The computing device as claimed in claim 5 wherein the processor causes the display to dynamically vary each graphical discontinuity indicator in response to changes in the geographical distance between adjoining map areas separated by the graphical discontinuity indicator.

* * * * *

UNITED STATES PATENT AND TRADEMARK OFFICE
CERTIFICATE OF CORRECTION

PATENT NO.         : 9,569,059 B2                                           Page 1 of 1
APPLICATION NO.    : 13/666184
DATED              : February 14, 2017
INVENTOR(S)        : Jason Tyler Griffin It is certified that error appears in the above-identified patent and that said Letters Patent is hereby corrected as shown below:

On the Title Page

Column 1, please amend the Applicant's name from "Black Berry" to "BlackBerry".

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*